June 9, 1925.

D. NUNN 1,540,799

SYSTEM FOR MEASURING THE CAPACITY OF ELECTRICAL CIRCUITS

Filed Feb. 6, 1923

Inventor:
Darrell Nunn
by Jael C.R. Palmer Atty

Patented June 9, 1925.

1,540,799

UNITED STATES PATENT OFFICE.

DARRELL NUNN, OF WEST KENSINGTON, LONDON, ENGLAND, ASSIGNOR TO WESTERN ELECTRIC COMPANY, INCORPORATED, OF NEW YORK, N. Y., A CORPORATION OF NEW YORK.

SYSTEM FOR MEASURING THE CAPACITY OF ELECTRICAL CIRCUITS.

Application filed February 6, 1923. Serial No. 617,283.

*To all whom it may concern:*

Be it known that I, DARRELL NUNN, a subject of the King of Great Britain, residing at West Kensington, London, W. 14, England, have invented certain new and useful Improvements in Systems for Measuring the Capacity of Electrical Circuits, of which the following is a full, clear, concise, and exact description.

This invention relates to a system and apparatus therefor, for measuring the capacity unbalance of electrical circuits and more particularly telephone circuits which are quadded to form phantom circuits.

An object of this invention is to provide a system and means which may be employed to measure the side to earth unbalances in a quadded circuit, the effect of the internal capacities existing between the pairs being eliminated from the measurement.

Another object of the invention is to provide a system and means whereby the side to earth unbalances, the side to side unbalance, and the phantom to side unbalances, may be measured without necessitating any alterations in the electrical connections between the four wires of the quadded circuit and the measuring apparatus, the values of these unbalances being obtained rapidly and accurately without the necessity of any calculations.

Other objects of the invention will appear hereinafter from the description of the invention.

Figure 1:
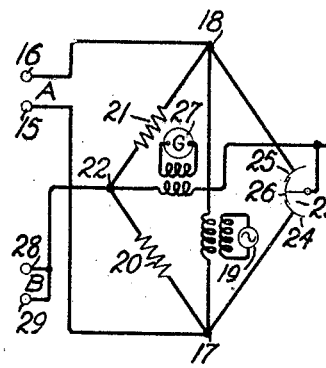
Figure 4:
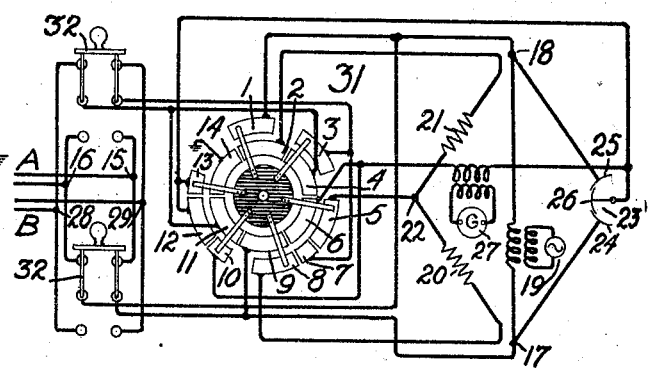
Figure 2:
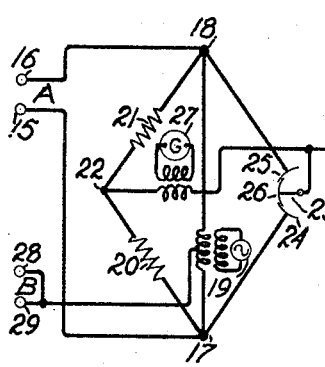
Figure 5:
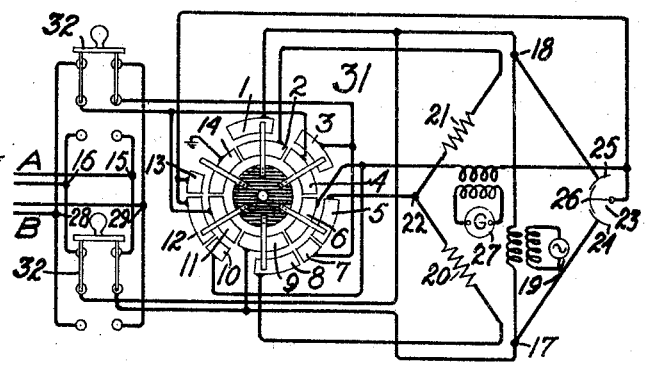
Figure 3:
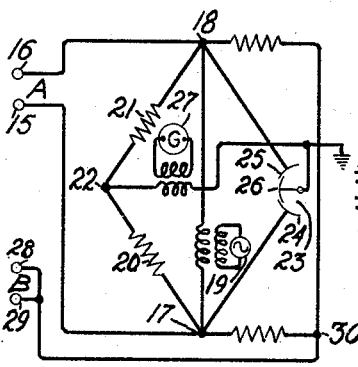
Figure 6:
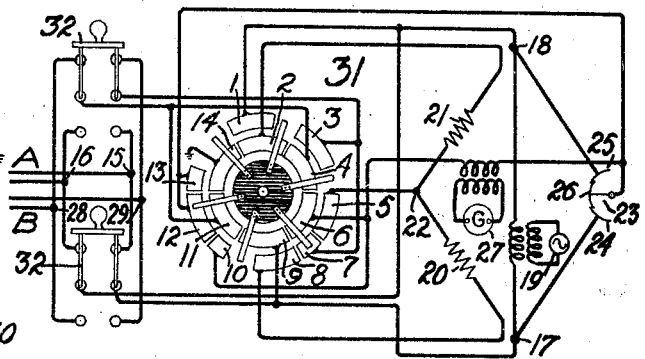

Referring to the drawings Figs. 1, 2 and 3 represent circuit arrangements which may be employed in measuring the side to earth unbalances. Fig. 4 is more detailed view embodying the features of Fig. 1. Fig. 5 is an arrangement whereby the phantom to side unbalance may be measured and Fig. 6 is an arrangement whereby the side to side unbalance may be measured.

The same characters of reference designate like parts in all figures of the drawing.

In order to obtain efficient transmission over a quadded telephone circuit it is essential that the highest possible degree of balance between the combinations of capacities formed by the direct capacities between the conductors of the cable be obtained. There are six such combinations to be balanced as follows: side to side, phantom to side pair 1, phantom to side pair 2, side to earth pair 1, side to earth pair 2, and phantom to phantom unbalance. The measurement of the last named combination, that is, phantom to phantom unbalance, is measured exactly in the same manner as the side to side unbalance, except that a new connection of the conductors of the quads to the testing apparatus is necessary. The following description will be made specific to the measurement of the first five unbalances, it being obvious that the sixth unbalance may be obtained by merely changing the electrical connections to the quadded circuit.

Two methods have heretofore been employed for determining the first five unbalances referred to above. In one of these methods eight measurements are made of simple combinations of the direct capacities between the conductors of the phantom circuit and between these conductors and earth, and from these eight measurements the five required unbalances are calculated. In order to draw a comparison between the time required to obtain capacity unbalance values by the two methods already in use and that provided by the present invention we will assume that the time taken by this first method is represented by 10.

In the second method which has heretofore been employed the first three of the unbalances referred to, that is, side to side unbalance and the phantom to side unbalances, are directly measured and the side to earth unbalances are obtained by calculation from three subsequent measurements. The approximate time required by this method may for purposes of comparison be represented by 4.

The present invention provides a system whereby all of the first five unbalances may be directly measured and no calculation is necessary. The approximate time required to obtain the values in this case may for purposes of comparison be represented by 2.5. The present invention therefore not only appears to effect a substantial saving in time over the methods heretofore employed but also tends to eliminate or wholly does away with the risk of errors in calculations.

Figs. 1, 2 and 3 show circuit arrangements which may be employed in order to obtain the side to earth unbalances. Referring more particularly to Fig. 1 the connections are shown for measuring the capacity unbalance of side A to earth. Conductors 15 and 16 comprising side A are connected respectively to points 17 and 18 on the bridge between which points alternating current from the source 19 is fed for measuring purposes. The ratio arms 20 and 21 are joined at point 22. A condenser 23 having two fixed elements 24 and 25 and one movable element 26, which is grounded, is provided. The potential indicating device 27 is connected between the movable element 26 and the junction of the ratio arms 22. Conductors 28 and 29 of side B are connected directly to the junction of the ratio arms at 22. It will be apparent from this arrangement that when the bridge has been balanced through the manipulation of the movable element of the condenser, the pair B which is not under test will be at the same potential as the movable element of the condenser although there is no direct electrical connection therebetween. The capacity between pair B and ground will therefore have no effect on the bridge balance. The capacities between pair B and conductors 15 and 16 will be in effect connected across resistances 20 and 21 respectively. The effect of these capacities will be to change the phase angle of the currents in the ratio arms without materially affecting their absolute values. Therefore, since the impedances in the other arms are substantially pure capacities the balance of the bridge will be unaffected by these capacity elements shunting the ratio arms. Thus a direct measurement of the capacity unbalance between pair A and earth has been effected without incorporating therein the internal capacity existing between pair A and pair B. No calculation therefore is required as heretofore has been the case.

It will be noticed from Fig. 1 that in effect the wires 28 and 29 of the pair not under test are connected to the midpoint of an impedance whose terminals are connected to the fixed elements of the condenser. It is not necessary, however, to make use of the ratio arms in this connection as will be seen by consideration of Figs. 2 and 3. In Fig. 2, wires 28 and 29 are connected to the midpoint of the transformer winding between points 17 and 18. In Fig. 3 a special impedance 30 is provided which has its terminals connected in like manner to the fixed elements of the condenser. This impedance may be either formed by capacity, inductance or resistance, or any combinations of these.

Having now described briefly the arrangements which may be used to measure directly the side to earth unbalances, an arrangement will be described which may be employed for the measurement of side to earth unbalances, phantom to side unbalances and side to side unbalance without necessitating any alteration in the electrical connections between the quadded circuit and the apparatus.

Referring to Fig. 4 it will be seen that a switch 31, having 14 contacts, is provided. This switch is adapted to be placed in three positions, and in this figure it is in the position for the measurement of side to earth unbalances. By following through the connections as shown in Fig. 4 it will be seen that the same arrangement as previously described in Fig. 1 is obtained. The connection of terminals 1 and 2 connects the ratio arm 21 with point 18. The connection of terminal 3 to terminal 4, of terminal 5 to terminal 6, and of terminal 10 to terminal 11 connects wires 28 and 29 of pair B (not under test) to the junction of the ratio arms at 22. The connection of terminals 5 and 6 also connects the potential indicating device between point 22 and the movable element 26. The connection of terminals 8 and 9 connects the ratio arm 20 with point 17. The connection of terminals 13 and 14 results in grounding the movable element 26. When it is desired to measure the capacity unbalance between side B and earth, it is merely necessary to throw switch 32 which reverses the connection of the apparatus to the pairs A and B.

Referring now to Fig. 5 the switch 31 is shown in a position for the measurement of the phantom to side unbalances. As in the previous case the connection of terminals 1 and 2 connects the ratio arm 21 with the point 18. The connection of terminals 3 and 4 and of terminals 11 and 12 connect the wires 28 and 29 of pair B to the movable element 26. The connection of terminals 5 and 6 connects the potential indicating device 27 between point 22 and the movable element 26. The connection of terminal 8 and terminal 9 connects ratio arm 20 with point 17. By the reversal of switches 32 the other phantom to side unbalance may be obtained. In Fig. 6 the switch 31 is shown in the position for the measurement of side to side unbalance. The connection of terminal 6 and terminal 7 connects the potential indicating device 27 between the movable element 26 and conductor 29. The connection of terminals 11 and 12 connects the conductor 28 directly to the movable element 26. As conductor 15 is normally connected to point 17 and conductor 16 to point 18 the apparatus is now in condition for the measurement of the side to side unbalance.

The invention claimed is:

1. An apparatus for measuring the capacity unbalances of a phantomed circuit comprising means for measuring the side-to-earth unbalances independently of the internal characteristics existing between the pairs of the phantomed circuit, said means comprising a bridge arrangement and means for symmetrically connecting one pair of line conductors with respect to the other pair while measuring the side to earth unbalance in said other pair.

2. In an apparatus for measuring the capacity unbalances of a phantomed circuit, means for measuring the side-to-earth unbalances independently of the internal capacities existing between the pairs, said means comprising a condenser having an adjustable element and two fixed elements, and connections whereby the pair of the circuit not under test at any particular time is given the same potential as the movable element of said condenser.

3. An apparatus for measuring the capacity unbalances of a phantomed circuit comprising a Wheatstone bridge network and unitary switching means for measuring the side-to-side unbalances and the phantom-to-side unbalances while maintaining fixed the electrical connections between the pairs of the phantomed circuit and the apparatus.

4. An apparatus for measuring the side-to-earth unbalances of a phantomed circuit comprising a Wheatstone bridge having a condenser with a grounded adjustable element and two fixed elements, said bridge comprising an impedance connected between the fixed elements of said condenser, switching means and connections whereby each wire of the pair to be measured is connected to one of the fixed elements, and the pair not under test is connected to the mid-point of said impedance.

5. An apparatus for measuring the side-to-earth unbalances of a phantomed circuit comprising a Wheatstone bridge network, containing in two adjacent ratio arms a condenser having two fixed elements and an adjustable element, switching means and connections whereby the pair not under test is connected to the common terminal of the other two ratio arms.

In witness whereof, I hereunto subscribe my name this 17th day of January, A. D., 1923.

DARRELL NUNN.